(12) United States Patent
Dunik et al.

(10) Patent No.: US 10,473,466 B2
(45) Date of Patent: Nov. 12, 2019

(54) APPARATUS AND METHOD FOR DATA-BASED REFERENCED NAVIGATION

(71) Applicant: Honeywell International Inc., Morris Plains, NJ (US)

(72) Inventors: Jindrich Dunik, Plzen (CZ); Milos Sotak, Slavkov u Brna (CZ); Milos Vesely, Nemcice (CZ); Wesley J. Hawkinson, Chanhassen, MN (US)

(73) Assignee: Honeywell International Inc., Morris Plains, NJ (US)

( * ) Notice: Subject to any disclaimer, the term of this patent is extended or adjusted under 35 U.S.C. 154(b) by 281 days.

(21) Appl. No.: 15/373,999

(22) Filed: Dec. 9, 2016

(65) Prior Publication Data

US 2018/0165591 A1 Jun. 14, 2018

(51) Int. Cl.
*G01C 21/16* (2006.01)
*G01C 21/30* (2006.01)

(52) U.S. Cl.
CPC ........... *G01C 21/165* (2013.01); *G01C 21/30* (2013.01)

(58) Field of Classification Search
None
See application file for complete search history.

(56) References Cited

U.S. PATENT DOCUMENTS 5,740,048 A 4/1998 Abel et al.
6,819,984 B1 * 11/2004 Bedckman ............. G01C 21/00
367/124
8,566,032 B2 10/2013 Chowdhary et al.
9,020,752 B2 4/2015 Lundquist et al.
9,161,175 B1 * 10/2015 Smith ..................... G01S 19/48
10,330,479 B2 * 6/2019 Loomis .................. G01C 21/30
(Continued)

FOREIGN PATENT DOCUMENTS

CA 2417056 10/2008
EP 1332336 10/2012

OTHER PUBLICATIONS

Gustafsson; Particle Filters for Positioning, Navigation, and Tracking; Feb. 2002; IEEE Transactions on Signal Processing; vol. 50 No. 2, p. 425-437; https://ieeexplore.ieee.org/abstract/document/978396 (Year: 2002).*

(Continued)

*Primary Examiner* — David P. Merlino
(74) *Attorney, Agent, or Firm* — Fogg & Powers LLC

(57) ABSTRACT

A method is provided. The method comprises: initializing a point mass filter; initializing the one or more Bayesian filters; obtaining measurement data associated with a horizontal position on a surface; obtaining measurement data of a horizontal position and a velocity; obtaining geo-mapping data; estimating, with the point mass filter, the horizontal position on the surface based upon the geo-mapping data and the measurement data; estimating, with the one or more Bayesian filters, remaining state parameters based upon an output of the point mass filter and the measurement data; predicting, with the point mass filter, an a priori horizontal position, on a surface for a future time when the next measurement data will be obtained; and predicting, with the one or more Bayesian filters, an a priori remaining state parameters for a future time when the next measurement data will be obtained.

8 Claims, 4 Drawing Sheets

(56) References Cited

U.S. PATENT DOCUMENTS

| | | | | |
|---|---|---|---|---|
| 2012/0022784 A1* | 1/2012 | Louis | ............. | G01C 21/005 |
| | | | | 701/445 |
| 2014/0236477 A1* | 8/2014 | Chen | ............. | G01S 13/867 |
| | | | | 701/450 |
| 2015/0346333 A1* | 12/2015 | Soto | ............. | G01S 13/08 |
| | | | | 702/143 |
| 2017/0160399 A1* | 6/2017 | Barrau | ............. | G01S 19/49 |

OTHER PUBLICATIONS

Grisetti; Improved Techniques for Grid Mapping with Rao-Blackwellized Particle Filters; Feb. 2007; IEEE Transactions on Robotics; vol. 23 Issue 1; http://www2.informatik.uni-freiburg.de/~stachnis/pdf/grisetti07tro.pdf; pp. 34-46 (Year: 2007).*

Conte, Gianpaolo et al., "A Visual Navigation System for UAS Based on Geo-Referenced Imagery", Artificial Intelligence and Integrated Computer System Division, 2011, pp. 1-6, Intl. Archives of the Photogrammetry, Remote Sensing and Spatial Information Sciences, vol. XXXVIII-1C22, Published: Zurich, Switzerland.

European Patent Office, "Extended European Search Report from EP Application No. 17204246.7 dated May 9, 2018", "from Foreign Counterpart of U.S. Appl. No. 15/373,999", May 9, 2018, pp. 1-11, Published in: EP.

Hektor, T. et al., "A Marginalized Particle Filter Approach to an Integrated INS/TAP System", IEEE, 2008, pp. 1-5, Published: Linkoping, Sweden.

Nordlund, Per-Johan, "Sequential Monte Carlo Filters and Integrated Navigation", Linkoping Studies in Science and Technology, 2002, pp. 1-114, Published: Reglerteknik automatic Control, Linkoping, Div. of Automatic Control, Dept. of Electrical Engineering, Linkopings universitet, Linkoping, Sweden.

Smild, Vaclav et al., "Rao-Blackwellized Point Mass Filter for Reliable State Estimation", Regional Innovation Centre or Electrical Engineering, University of West Bohemia, Pilsen, Czech Republic, 2013, p. 1-7, Published:16th International Conference on Information Fusion, Istanbul, Turkey.

Wibowo, Sigit Basuki, "Rao-Blackwellized Particle Filter for Pattern Matching Indoor Localisation", Martin Klepal NIMBUS Centre for Embedded Systems Research, Cork Institute of Technology, 2010, p. 1-6, Published: IEEE Cork, Ireland.

Jeon et al., "Nonlinear aircraft tracking filter utilizing a point mass flight dynamics model", Feb. 14, 2012, pp. 1-17, Publisher: Institution of Mechanical Engineers.

"Non-Legislative Acts Regulations", Official Journal of the European Union, Legislation L 340, Dec. 24, 2015, pp. 1-308, vol. 58, Publication Office of the European Union.

Alspach et al., "Nonlinear Bayesian Estimation Using Gaussian Sum Approximations", IEEE Transactions on Automatic Control, Aug. 1972, pp. 1-10, vol. AC-17, No. 4, IEEE.

Bergman, "Recursive Bayesian Estimation: Navigation and Tracking Applications", Department of Electrical Engineering, 1999, pp. 1-219, Linkoping University.

Frykman, "Applied particle filters in integrated aircraft navigation", Automatic Control and Communication Systems, Apr. 28, 2003, pp. 178, Linkopings Universitet.

Gustafsson, "Particle Filter Theory and Practice with Positioning Applications", IEEE A & E Systems Magazine, Jul. 2010, pp. 1-30, vol. 25, No. 7, IEEE.

Schon et al., "Marginalized Particle Filters for Mixed Linear/Nonlinear State-Space Models", IEEE Transactions on Signal Processing, Jul. 2005, pp. 1-11, vol. 53, No. 7, IEEE.

Simandl et al., "Advanced point-mass method for nonlinear state estimation", Science Direct, Mar. 20, 2006, pp. 1-13, Elsevier.

Sirola, "Mathematical Methods for Personal Positioning and Navigation", Tampere University of Technology, 2007, pp. 1-125, Publication 675, Tampere.

European Patent Office, "Communication pursuant to Article 94(3) from EP Application No. 17204246.7 dated Feb. 7, 2019", from Foreign Counterpart to U.S. Appl. No. 15/373,999, dated Feb. 7, 2019, pp. 18, Published: EP.

* cited by examiner

APPARATUS AND METHOD FOR DATA-BASED REFERENCED NAVIGATION

BACKGROUND

When position data from a global navigation satellite system is unavailable, a parameter, associated with a horizontal position (e.g. latitude and longitude) of a moveable object over a known surface such as terrain map, may be measured. Deterministic models may be used to determine the horizontal position.

A deterministic approach does not take into account model and sensor inaccuracies and noise. To address these shortcomings, non-linear Bayesian state estimators of stochastic dynamic systems may be used to estimate the horizontal position (and related parameters) of the moveable object on a known surface based upon a parameter associated with a horizontal position. However, a non-linear state estimator, based on a numerical solution of the Bayesian relations, i.e., a point mass filter, requires significant computation resources. The state estimator estimating three or more variables cannot be solved with typical data processing systems in a period of time consistent with application requirements. Therefore, there is a need to reduce the computational requirements for these non-linear estimators used to estimate the horizontal position (and related parameters) on a known surface based upon a measured parameter associated with the horizontal position.

SUMMARY

A method is provided. The method comprises: initializing a point mass filter; initializing the one or more Bayesian filters; obtaining measurement data associated with a horizontal position on a surface; obtaining measurement data of a horizontal position and a velocity; obtaining geo-mapping data; estimating, with the point mass filter, the horizontal position on the surface based upon the geo-mapping data and the measurement data; estimating, with the one or more Bayesian filters, remaining state parameters based upon an output of the point mass filter and the measurement data; predicting, with the point mass filter, an a priori horizontal position, on a surface for a future time when the next measurement data will be obtained; and predicting, with the one or more Bayesian filters, an a priori remaining state parameters for a future time when the next measurement data will be obtained.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout figures and text.

DETAILED DESCRIPTION

Figure 1:
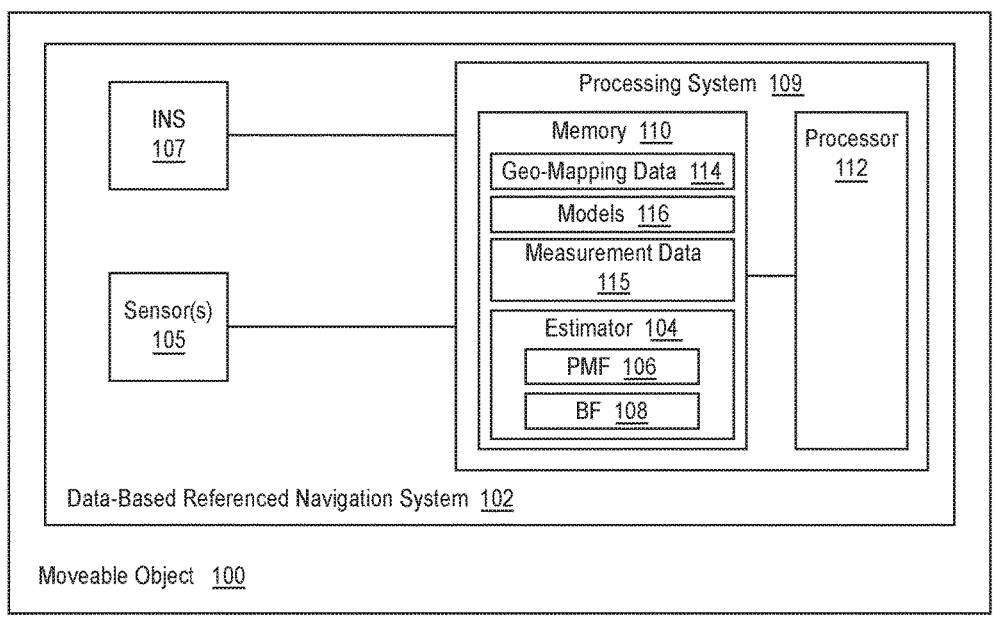
FIG. 1 illustrates an exemplary block diagram of a moveable object that includes a data-based referenced navigation system comprising a point mass filter and one or more Bayesian filters.

In the following detailed description, reference is made to the accompanying drawings that form a part hereof, and in which is shown by way of illustration specific illustrative embodiments. However, it is to be understood that other embodiments may be utilized and that structural, mechanical, and electrical changes may be made. Furthermore, the method presented in the drawing figures and the specification is not to be construed as limiting the order in which the individual steps may be performed. The following detailed description is, therefore, not to be taken in a limiting sense.

A Rao-Blackwellized point mass filter (RBPMF) is used to overcome the computational complexity related limitations of the point mass filter (PMF). The point mass filter is a non-linear Bayesian state estimator based on a numerical solution to the integral Bayesian recursive relations. RBPMF is an estimator that is an extension of a point mass filter, and permits a state variable model to be decomposed into non-linear state equation(s) and linear state equation(s). The non-linear state equation(s) can be solved by a standard point mass filter. The linear state equation(s) can be solved by one or more linear estimators, i.e. one or more Bayesian filters (BFs), which are much more computationally efficient. In one embodiment, the Bayesian filters are Kalman filters (KF). The term Kalman filters shall include all variations of Kalman filters, including for example extended Kalman filters.

This decomposition, therefore, significantly reduces the computational requirements of the point mass filter as the corresponding non-linear state equation(s) have fewer variables. As a result, the Rao-Blackwellized point mass filter can estimate, with typical data processing systems, the horizontal position (and other related parameters) of a moveable object on a known surface based upon a measured parameter associated with a horizontal position and geo-mapping data with much lower computational load than the point mass filter. Therefore, processing systems can perform the necessary computations in a period of time consistent with application requirements.

The Rao-Blackwellized point mass filter can be employed with any type of known surface, e.g. three dimensional bathymetric maps, barometric pressure maps, stellar maps, gravity maps, gravity gradient maps, magnetic maps, and terrain maps. In one embodiment, the map's horizontal position is parameterized by latitude and longitude. In another embodiment, such maps may be digitized. In a further embodiment, horizontal position and geo-mapping data are in reference to mean sea level.

FIG. 1 illustrates an exemplary block diagram of a moveable object 100 that includes, or to which is attached, a data-based referenced navigation system 102 comprising a point mass filter 106 and one or more Bayesian filters (BF) 108. The moveable object 100 can be a living creature (such as a human being or animal), a vehicle (such as an aircraft, a helicopter, a missile, a space craft, a rocket, a ship, a submarine, an automobile, and a truck), or anything for which position tracking is desirable.

The data-based referenced navigation system 102 comprises a processing system 109 coupled to an inertial navigation system (INS) 107 and one or more additional sensors (sensors) 105. The inertial navigation system 107 provides estimates of vector velocity and position. In one embodiment, the inertial navigation system 107 comprises one or more inertial measurement units (IMUs) coupled to a processor. In another embodiment, each of the one or more inertial measurement units includes one or more gyroscopes and one or more accelerometers.

The one or more sensors 105 measure data associated with a horizontal position on a known surface. In one embodiment, the one or more sensors 105 may include one or more of altimeters (e.g. barometric and/or radar), pressure sensors, accelerometers (e.g. measuring gravity), magnetometers, gravity gradiometers, gravimeters, water depth sensors, a bathymetric echo-sounder, a camera-type sensor, star trackers, and/or IMUs including accelerometer(s) and/or gyroscope(s).

The processing system 109 comprises a memory 110 coupled to a processor 112. An estimator 104, geo-mapping data 114, measurement data 115, and models 116 are stored in the memory 110. The estimator 104 includes the point mass filter 106 and the one or more Bayesian filters 108. The processing system 109 is configured to estimate the horizontal position on the surface based upon the geo-mapping data 114, the models 116, the measurement data 115, and the estimator 104. Horizontal position error may also be estimated as further described below.

The geo-mapping data 114 is a representation of a distribution of a parameter over the surface. In one embodiment, geo-mapping data 114 includes terrain geo-mapping data, bathymetric geo-mapping data, gravity field geo-mapping data, gravity gradient field geo-mapping data, magnetic field geo-mapping data, and image-based (e.g. stellar and/or terrestrial image-based) geo-mapping data. In another embodiment, the geo-mapping data 144 is stored in the form of a database, e.g. with records indexed based upon horizontal position such as latitude and longitude, and which store a corresponding surface parameter, such as terrain height, at that horizontal position. The measurement data 115 includes data measured by the inertial navigation system 107, and by the one or more sensors 105.

In one embodiment, the models 116, which may be in the form of executable software, include without limitation a state space model for direct and/or indirect estimation of the horizontal position. In another embodiment, the state space model comprises a state equation that is linear and a measurement equation that is non-linear. In a further embodiment, the models include models of the one or more sensors 105, the inertial navigation system 107, and the dynamics of the moveable object 100. In yet another embodiment, the state space model comprises a state equation and a measurement equation.

Typically, the state equation describes time-evolution of state parameters, e.g., of the horizontal position of the moveable object 100; of the error (e.g. bias, noise, or correlated noise) of the one or more sensors 105 and/or the inertial navigation system 107; and/or error (e.g. bias, noise, correlated noise) of the geo-mapping data 114. The measurement equation relates directly unmeasurable state parameters with available measurements of the one or more sensors 105, and the inertial navigation system 107. Definition of the state variables, selection of the sensor measurements, and design of the state-space model is performed by the filter designer.

One embodiment of the state space model, and the model for a direct estimation of the vehicle horizontal position, is illustrated below. The 'state equation' identified below is the linear state equation. The measurement equation is the non-linear equation.

$$x_{k+1} = \begin{bmatrix} x_{k+1}^n \\ x_{k+1}^l \end{bmatrix} = \begin{bmatrix} F & \beta \\ \gamma & \alpha \end{bmatrix} x_k + \begin{bmatrix} u_k \\ 0 \end{bmatrix} + w_k \text{(state equation)} \qquad \text{(Equation 1)}$$

$$z_k = h(x_k^n) + H x_k^l + v_k \text{(measurement equation)}$$

$x_{k+1}$ is the state for which time behavior is modelled by the state equation, $x_{k+1}^n$ is a non-linear component of a state, the horizontal position of the moveable object 100, which is estimated with the point mass filter 106, $x_{k+1}^l$ is a linear component of the state, including parameters related to the horizontal position (e.g., horizontal velocity or acceleration), bias(es) (i.e. errors correlated in time) of the one or more sensors 105, the inertial navigation system 107 and/or the geo-mapping data 114, which are estimated with the one or more Bayesian filters 108. The correlated errors may be, for example, due to variations in weather conditions, such as temperature, local pressure, and due to the variations in altitude, $u_k$ is a known input vector, that is part of the state equation, and represents a change of horizontal position based upon the output of the inertial navigation system 107. In one embodiment, the change of horizontal position is determined by determining a vector velocity between two sampling time instants. In another embodiment, the change of the horizontal position is not assumed to be known and is considered to be zero, $z_k$ is part of the measurement equation, and is a parameter measured by the one or more sensors 105, e.g. altitude, $$F = \begin{bmatrix} 1 & 0 \\ 0 & 1 \end{bmatrix}$$

is a known system matrix of the non-linear part of the model of the state equation. This matrix is specified by the filter designer and corresponds to the expected type of motion of the moveable object 100. In one embodiment, the matrix can vary over time, $\alpha$ is a known system matrix of the linear model of the state equation, and has elements determined based upon the properties of the states. This matrix is specified by the filter designer and corresponds to the expected type of motion of the moveable object 100, or to the properties of the one or more sensors 105 and/or the inertial navigation system 107. In one embodiment, the matrix can be vary over time, $\beta, \gamma$ are known system matrices describing relations between linear and non-linear parts of the model. These matrices are specified by the filter designer and correspond to the expected type of motion of the moveable object 100, or to the properties of the one or more sensors 105 and/or the inertial navigation system. In one embodiment, $$\beta = \begin{bmatrix} 0 & 0 \\ 0 & 0 \end{bmatrix} \text{ and } \gamma = \begin{bmatrix} 0 & 0 \\ 0 & 0 \end{bmatrix}$$

In another embodiment, the matrices can vary over time,
h($x_k^n$) is a known non-linear function of the non-linear component of the state vector $x_k^n$, which is typically represented by a map. In one embodiment, the function can vary over time, H is a known matrix in the measurement equation relating the linear component of the state vector $x_k^l$ and the measurement. In one embodiment, the matrix can vary over time, $$w_k = \begin{bmatrix} w_k^n \\ w_k^l \end{bmatrix}$$

is unknown noise in the state equation which quantifies uncertainty in the state equation and input vector. The probability density function (PDF) $p_{w_k}(w_k)$ is known. For example, it may be a Gaussian variable with zero mean and a known covariance matrix, $$Q = \begin{bmatrix} Q^n & 0 \\ 0 & Q^l \end{bmatrix},$$

and $v_k$ is unknown noise in the measurement equation that quantifies all uncertainty in the measurement equation, measurements of the one or more sensors 105, and possibly uncertainty in the geo-mapping data. The noise is described by the known PDF $p_{v_k}(v_k)$. For example, it may have a Gaussian distribution with zero mean and known covariance matrix R.

The models 116 may alternatively include a state space model for indirect estimation of the horizontal position in lieu of the state space model for direct estimation of the horizontal position (described above). In this case, the point mass filter 106 does not directly estimate the horizontal position of the moveable object 100, but rather estimates the difference between the output of the one or more IMUS 107 and a true position. In one embodiment, the state space model comprises a state equation that is linear and a measurement equation that is non-linear. The state space model is illustrated below. The 'state equation' identified below is the linear state equation. The measurement equation is the non-linear equation.

$$x_{k+1} = \begin{bmatrix} x_{k+1}^n \\ x_{k+1}^l \end{bmatrix} = \begin{bmatrix} F & \beta \\ \gamma & \alpha \end{bmatrix} x_k + w_k \text{ (state equation)} \quad \text{(Equation 2)}$$

$$z_k = \tilde{h}(x_k^n + \hat{x}_k^{DR}) + Hx_k^l + v_k \quad \text{(measurement equation)}$$
$$= h(x_k^n) + Hx_k^l + v_k$$

$x_{k+1}$ is the state for which time behavior is modeled by the state equation, $\hat{x}_k^{DR}$ is a horizontal position of the moveable object 100 provided by the inertial navigation system 107, $x_{k+1}^n$ is a non-linear component of the state, a difference between the horizontal position of the moveable object 100, provided by the inertial navigation system 107, and the true position, $x_{k+1}^l$ is a linear component of the state bias(es) (or errors correlated in time) of the one or more sensors (105), the inertial navigation system 107, and/or the geo-mapping data 114, $z_k$ is a parameter measured by the one or more sensors 105, e.g. altitude, F is a known matrix with elements determined on the basis of the properties of position estimate bias of the inertial navigation system 107 in longitudinal and latitudinal directions. This matrix is specified by the filter designer, and corresponds to the expected type of motion of the moveable object 100 and properties of the one or more sensors 105 and/or the inertial navigation system 107. In one embodiment, the matrix can vary over time, α is a matrix with elements determined on the basis of the properties of the biases (or errors correlated in time) of the one or more sensors 105, the inertial navigation system 107 and/or geo-mapping data 114. This matrix is specified by the filter designer and corresponds to the expected type of motion of the moveable object 100, β,γ are known system matrices describing relations between linear and non-linear parts of the model. These matrices are specified by the filter designer and correspond to the expected type of motion of the vehicle 100 or to the properties of the one or more sensors 105 and/or the inertial navigation system 107. In one embodiment, $$\beta = \begin{bmatrix} 0 & 0 \\ 0 & 0 \end{bmatrix} \text{ and } \gamma = \begin{bmatrix} 0 & 0 \\ 0 & 0 \end{bmatrix}.$$

In another embodiment, the matrices can vary over time, and h(•) is a non-linear function represents the geo-mapping data 114, and maps the outputs of the inertial navigation system 107, and the bias of those outputs, to horizontal position on the map. In one embodiment, the he function can vary over time.

The estimated model parameters are represented by probability density functions (PDFs) which are typically continuous function. However, because modern computation systems operate discretely, the PDFs must also be discretized. Thus, a continuous PDF $p_x(x)$ having an independent variable x must be approximated by a grid of equally spaced points $\xi^{(i)}$, i=1, ..., N, to create an approximate discretized PDF of the random scalar variable x:

$$p_x(x) \cong \sum_{i=1}^{N} P^{(i)}(\xi^{(i)}) S\{x:\xi^{(i)}, \delta\}, \quad \text{(Equation 3)}$$

where $P^{(i)}(\xi^{(i)}) = p_x(\xi^{(i)})$, δ is the distance between two adjacent points defining resolution of the grid points, i.e., $\delta = \xi^{(i)} - \xi^{(i-1)}$, and $S\{x:\xi^{(i)}, \delta\}$ is a selection function defined as:

$$S\{x:\xi, \delta\} = 1\left[x - \left(\xi - \frac{\delta}{2}\right)\right] - 1\left[x - \left(\xi + \frac{\delta}{2}\right)\right] \quad \text{(Equation 4)}$$

with 1[·] being a unit step function defined for a scalar variable y as:

$$1[y] = 1, y \geq 0 \quad \text{(Equation 5)}$$
$$= 0, \text{ otherwise.}$$

The selection function $S\{x:\xi,\delta\}$ has a value 1 in if $$x \in \left(\xi - \frac{\delta}{2}, \xi + \frac{\delta}{2}\right),$$

otherwise, it has a value 0. The integral of the selection function is:

$$\int S\{x:\xi,\delta\}dx = \delta.$$

For vector variables, the selection function, the vicinity $\delta$ of a grid point $\xi^{(i)}$, and the volume $\Delta$ are defined analogously.

Figure 2:
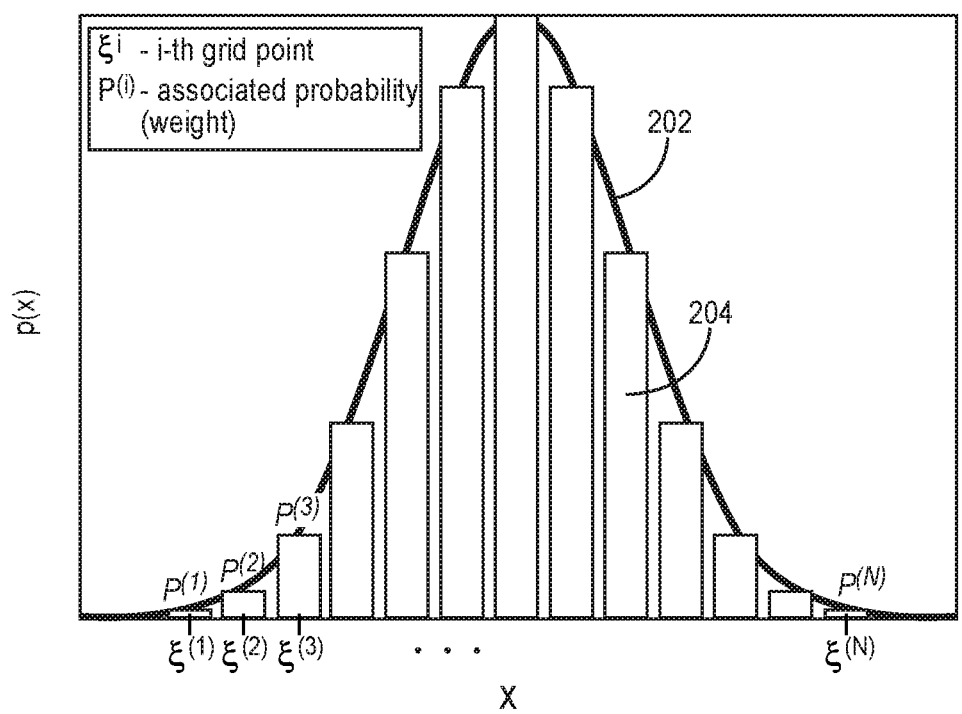
FIG. 2 illustrates an exemplary continuous probability density function and an exemplary discretized probability density function.
Figure 3:
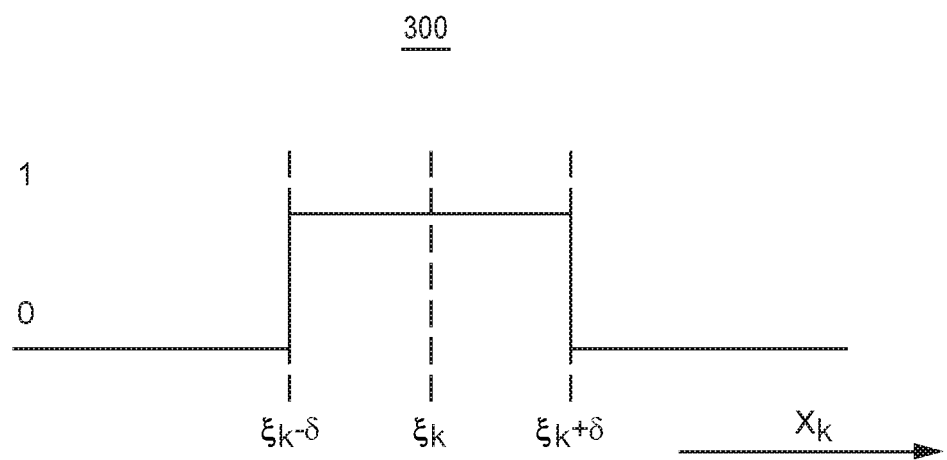
FIG. 3 illustrates an exemplary grid point selection function.

FIG. 2 illustrates an exemplary continuous PDF 202 and an exemplary discretized PDF 204. FIG. 3 illustrates an exemplary grid point selection function 300.

Figure 4:
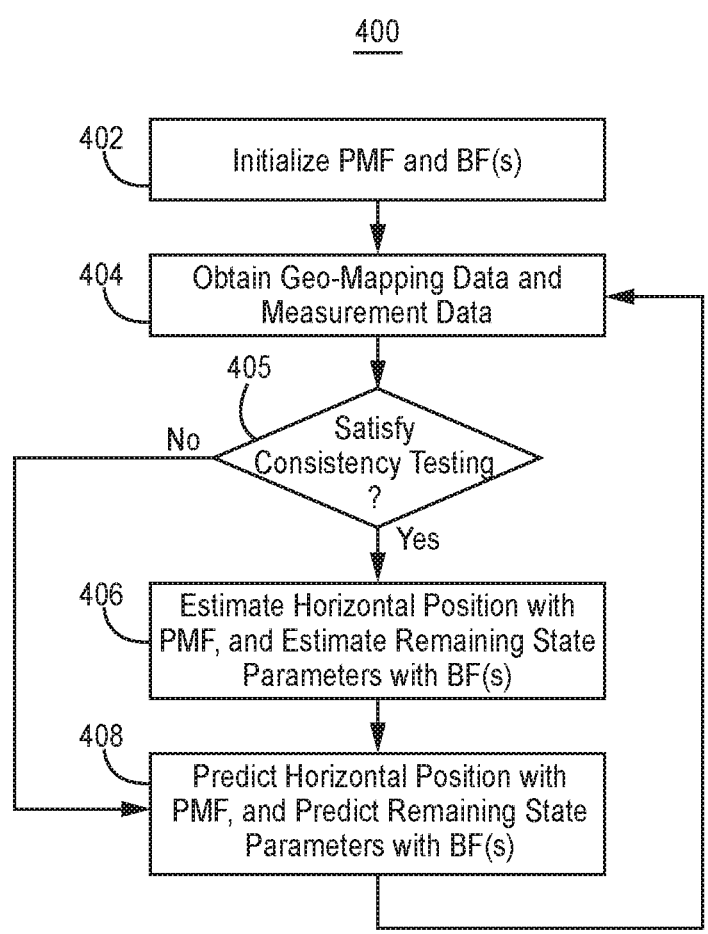
FIG. 4 illustrates an exemplary method of operation of the data-based referenced navigation system comprising a point mass filter and one or more Bayesian filters.

FIG. 4 illustrates an exemplary method 400 of operation of the data-based referenced navigation system 102 comprising a point mass filter 106 and one or more Bayesian filters (BF) 108 which shall now be described. In block 402, initialize the filters, i.e. the point mass filter 106 and the one or more Bayesian filters 108, with an a priori horizontal position estimate. In block 404, obtain (or load) geo-mapping data 114 for a region proximate to the a priori horizontal position estimate, e.g. of the moveable object 100, and obtain (or load) measurement data 115 that includes at least one of data associated with a horizontal position on a surface, and horizontal position and velocity. In one embodiment, such measurement data 115 is obtained from the at least one of the one or more sensors 105 and/or the inertial navigation system 107.

In one embodiment, in block 405, determine if consistency testing is satisfied. Consistency testing evaluates whether the measurement data 115 obtained or originating from the one or more sensors 105, to be used in block 406, is in an expected range that is specified by the filter designer and the present properties of the actual state estimate. If such measurement data 115 is outside of the expected range, then proceed to block 408. If such measurement data 115 is within the expected range, then proceed to block 406.

In block 406, estimate horizontal position, e.g. of the moveable object 100, based upon measurement data 115 obtained from the one or more sensors 105, the geo-mapping data 114 loaded, and the a priori (or predicted) horizontal position estimate. Also, estimate of the remaining state parameters using the one or more Bayesian filters 108. In one embodiment, in block 408, predict, with the point mass filter 106, a new a priori horizontal position, e.g. of the moveable object 100, for a future time when the next measurement data 115 will be obtained. Also, predict the remaining state parameters using the one or more Bayesian filters 108. In another embodiment, return to block 404 and continue the process.

Each block in FIG. 4 will now be further described and exemplified. For block 402, the initial discretized PDF is a joint probability distribution function:

$$p(x_0^n, x_0^l | z^{-1}) = p(x_0^l | x_0^n, z^{-1}) p(x_0^n | z^{k-1}) = p(x_0^l | z^{-1}) p(x_0^n | z^{k-1})$$

where:

$$p(x_0^n | z^{-1}) = \int p(x_0^n, x_0^l | z^{-1}) dx_0^l = p(x_0^n) = N\{x_0^n : \hat{x}_{0|-1}^n, P_{0|-1}^n\}$$

$$p(x_0^l | z^{-1}) = \int p(x_0^n, x_0^l | z^{-1}) dx_0^n = p(x_0^l) = N\{x_0^l : \hat{x}_{0|-1}^l, P_{0|-1}^l\} \quad \text{(Equation 6)}$$

where $N\{x:\hat{x},P\}$ denotes the Gaussian distribution of the random variable x with the mean $\hat{x}$ and covariance matrix P, $p(x_0^n | z^{-1})$ is representative of a probability density function associated with an initial estimated horizontal position, e.g. of the moveable object 100, and $p(x_0^l | z^{-1})$ is representative of a probability density function associated with an initial estimated bias (or an initial estimated error correlated in time) of the one or more sensors 105, the inertial navigation system 107, the geo-mapping data 114, and/or other states belonging to linear part of the state vector.

In block 402, the values stored in the grid points for the point mass filter 106 and the one or more Bayesian filters 108 are a priori estimates, e.g. by the processing system 109, of the horizontal position of the moveable object 100. The subsequent estimation, e.g. performed by the processing system 109, determines more accurately the horizontal position of the moveable object 100.

In one embodiment, the point mass filter 106 is initialized by approximating the point mass filter 106 with a discretized PDF corresponding to an initial estimated horizontal position of the moveable object 100:

$$p(x_0^n | z^{-1}) \cong \sum_i P_{0|-1}^{(i)}(\xi_0^{(i)}) S\{x_0^n : \xi_0^{(i)}, \delta\} \quad \text{(Equation 7)}$$

where $\xi_0^{(i)}$ is the i-th grid point defined by a user, $P_{0|-1}^{(i)}(\xi_0^{(i)}) = p(\xi_0^{(i)} | z^{-1}) = N\{\xi_0^{(i)} : \hat{x}_{0|-1}^n, P_{0|-1}^n\}$ is the value of the initial discretized PDF at the point, (initial, predicted discretized PDF sampled at i-th grid point), and $S\{x_0^n : \xi_0^{(i)}, \delta\}$ is the selection function which is a piecewise constant function of variable $x_k^n$ at the point $\xi_k^{(i)}$ within the interval $\delta$.

Each grid point represents a possible horizontal position of the moveable object 100 where probability is evaluated. The probability that the moveable object 100 is proximate to the position of the point $\xi_0^{(i)}$ is equal to $P_{0|-1}^{(i)}(\xi_0^{(i)})$. The vicinity of the point $\xi_0^{(i)}$ is defined by $\delta$.

For block 402, in one embodiment, the one or more Bayesian filters 108 have an initial condition of:

$$p(x_0^l | z^{k-1}) = p(x_0^l) = N\{x_0^l : \hat{x}_{0|-1}^l, P_{0|-1}^l\} \quad \text{(Equation 8)}$$

Because of the selected factorization of the initial discretized PDF, i.e. $p(x_0^l, x_0^n | z^{-1}) = p(x_0^l | x_0^n, z^{-1}) p(x_0^n | z^{k-1})$, the state of the linear part of the model is estimated by a set of one or more Bayesian filters 108, each associated with one grid point $\xi_0^{(i)}$. Thus, N Bayesian filters are initialized by creating N initial discretized PDFs:

$$p(x_0^l | \xi_0^{(i)}, z^{k-1}) = N\{x_0^l : \hat{x}_{0|-1}^{l(i)}, P_{0|-1}^{l(i)}\} = N\{x_0^l : \hat{x}_{0|-1}^l, P_{0|-1}^l\} \quad \text{(Equation 9)}$$

In one embodiment, the initial mean and variance at each grid point is the same. The approximate discretized initial PDFs can be visualized with grids representing horizontal position. Each grid point represents a possible horizontal position of the moveable object 100 and corresponding probability that the moveable object 100 is in the vicinity of that grid point.

Block 404 shall now be further discussed. The geo-mapping data 114 that is loaded in block 404 corresponds to the a priori estimate of the horizontal position of the moveable object 100 determined in block 402. The geo-mapping data 114 is a non-linear function of the horizontal position $x_0^n$, represented in the state equation by the term.

One embodiment of block 406, position estimation, shall now be described. Description of the filtering step of the RBPMF is presented with respect to the direct model with zero matrices for β,γ. Block 406 comprises estimating horizontal position representing the non-linear part of the state vector and state components representing linear part of the state vector based upon measurement data 115 obtained (originating from the one or more sensors 105), the geo-mapping data 114 loaded, and the a priori horizontal position estimate. The horizontal position estimate is in the form of a discretized PDF $p(x_k^n, x_k^l | z^{k-1})$ and is determined by applying the point mass filter 106 and the one or more Bayesian filters 108 to the measurement data 115 obtained (originating with the one or more sensors 105), the geo-mapping data 114 loaded, and the a priori state estimate, including the horizontal position estimate.

The PDF $p(x_k^n, x_k^l | z^k)$ is determined based upon the following factorisation:

$$p(x_k|z^k) = p(x_k^n, x_k^l | z^k) = p(x_k^l | x_k^n, z^k) p(x_k^n | z^k) \quad \text{(Equation 10)},$$

where $p(x_k^n | z^k)$ is determined with the point mass filter 106, and $p(x_k^l | x_k^n, z^k)$ is determined with the one or more Bayesian filters 108. The determination of non-linear and linear portions of the state space model respectively using the point mass filter 106 and the one or more Bayesian filters 108 shall now be described in further detail.

Measurement Update of Non-Linear Portion of State Vector with Point Mass Filter

The output of the point mass filter 106 is updated based upon the measurement data 115 (originating from the one or more sensors 105), and the geo-mapping data 114. The measurement update of the non-linear portion of the state $p(x_k^n|z^k)$ with the point mass filter 106 is performed as follows. In one embodiment, a measurement prediction is determined for each grid point $\xi_k^{(i)}$ to determine a probability represented by a discretized PDF of measurement likelihood that the i-th grid point $\xi_k^{(i)}$ maps to the measurement $z_k$ (originating from the one or more sensors 105). The geo-mapping data 114 is evaluated at each $\xi_k^{(i)}$, and the value $h(\xi_k^{(i)})$ is determined for each grid point. The measurement likelihood is determined according to:

$$P_{mLike,k}^{(i)} = N\{z_k; h(\xi_k^{(i)}) + H\hat{x}_{k|k-1}^{l(i)}, HP_{k|k-1}^{l(i)}H^T + R\}, \forall i$$

The estimated position is determined based upon the a priori horizontal position estimate, the measurement data 115 obtained (originating from the one or more sensors 105), and the portion of the geo-mapping data 114:

$$p(x_k^n | z^k) \cong \sum_i P_{k|k}^{(i)}(\xi_k^{(i)}) S\{x_k^n; \xi_k^{(i)}, \delta\} \quad \text{(Equation 11)}$$

where:

$$P_{k|k}^{(i)}(\xi_k^{(i)}) = c^{-1} P_{k|k-1}^{(i)}(\xi_k^{(i)}) P_{mLike,k}^{(i)}$$

$$c = \sum_{j=1}^{N} P_{k|k-1}^{(j)}(\xi_k^{(j)}) P_{mLike,k}^{(j)}$$

c is a normalizing function so that the sum of the discretized PDFs equals one. In this step, each PMF grid point is weighted according its measurement likelihood $P_{mLike,k}^{(i)}$ and predictive probability. Thus, the grid points remain unchanged, but their weights (in other words, the associated probability) are altered based upon the measurement data 115.

Once the discretized PDF $p(x_k^n|z^k)$ is determined, various conditional statistics of the discretized PDF $p(x_k^n|z^k)$ can be evaluated. The conditional mean and covariance matrices are determined according to:

$$\hat{x}_{k|k}^n = \sum_i \xi_k^{(i)} P_{k|k}^{(i)}(\xi_k^{(i)})\Delta = \sum_i \varpi_{k|k}^{(i)} \xi_k^{(i)} \quad \text{(Equation 12)}$$

$$P_{k|k}^n = \sum_i \varpi_{k|k}^{(i)}(\xi_k^{(i)} - \hat{x}_{k|k}^n)(\xi_k^{(i)} - \hat{x}_{k|k}^n)^T$$

where:

$$\varpi_{k|k}^{(i)} = P_{k|k}^{(i)}(\xi_k^{(i)})\Delta$$

The conditional mean $\hat{x}_{k|k}^n$ in is an optimal estimate applying, e.g. a minimum mean square error analysis. A maximum a posteriori probability estimate can also be determined:

$$\hat{x}_{k|k(MaxAP)}^n = \operatorname*{argmax}_i (P_{k|k}^{(i)}(\xi_k^{(i)})) \quad \text{(Equation 13)}$$

Horizontal position error can be estimated based upon the covariance matrix.

Measurement Update of Linear Portion of State Vector with Bayesian Filters

Additionally, for block 406, errors of at least one of one or more parameter sensors, the geo-mapping data, the one or more IMUs, and/or remaining elements of the linear state are estimated using the one or more Bayesian filters 108 based upon the output of the point mass filter 106 and the obtained measurement data 115 (originating from the one or more sensors 105). The measurement update of the linear portion of the state $p(x_k^l | x_k^n, z^k)$ with the one or more Bayesian filters 108 is performed as follows. A Bayesian filter is applied for each grid point. Thus, the predictive estimates of the linear part of the state associated with each grid point are updated with the available measurement according to:

$$\hat{x}_{k|k}^{l(i)} = \hat{x}_{k|k-1}^{l(i)} + K_k^{(i)}(z_k - h(\xi_k^{(i)}) - \hat{x}_{k|k-1}^{l(i)})$$

$$P_{k|k}^{l(i)} = P_{k|k-1}^{l(i)} - K_k^{(i)} P_{k|k-1}^{l(i)}, \forall i,$$

where:

$$K_k^{(i)} = P_{k|k-1}^{l(i)}(P_{k|k-1}^{l(i)} + R)^{-1} \quad \text{(Equation 14)}$$

Having the filtering estimates determined for each grid point, the global estimate of the linear part of the state space model can be determined according to:

$$\hat{x}_{k|k}^l = \sum_i \varpi_{k|k}^{(i)} \hat{x}_{k|k}^{l(i)} \quad \text{(Equation 15)}$$

$$P_{k|k}^l = \sum_i \varpi_{k|k}^{(i)} \left[ P_{k|k}^{l(i)} + (\hat{x}_{k|k}^{l(i)} - \hat{x}_{k|k}^l)(\hat{x}_{k|k}^{l(i)} - \hat{x}_{k|k}^l)^T \right]$$

where:

$$\varpi_{k|k}^{(i)} = P_{k|k}^{(i)}(\xi_k^{(i)})\Delta,$$

The relations can be understood as the relations for computation of the moments of a Gaussian mixture PDF.

Block 408 shall now be further discussed. In block 408, a predictive estimate is determined for a new a priori horizontal position, e.g. of the moveable object 100, for a future time when the next measurement data 115 from the one or more sensors 105 will be next obtained. The new a priori horizontal position is predicatively estimated based upon measurement data 115 from the inertial navigation system 107 and the state equation.

In one embodiment, a new grid is first constructed. Then, the point mass filter 106 is updated with the new grid. Finally, the one or more Bayesian filters 108 are updated with the new grid.

In one embodiment, a predictive discretized PDF $p(x_{k+1}^n, x_{k+1}^l | z^k)$ is determined according to the Chapman-Kolmogorov equation based upon the filtered discretized PDF $p(x_k^n, x_k^l | z^k)$ based upon the following factorisation:

$$p(x_{k+1}|z^k) = p(x_{k+1}^n, x_{k+1}^l | z^k) = p(x_{k+1}^l | x_{k+1}^n, z^k) p(x_{k+1}^n | z^k) \quad \text{(Equation 16)},$$

where $p(x_{k+1}^n | z^k)$ is determined by the point mass filter 106, and $p(x_{k+1}^l | x_{k+1}^n, z^k)$ is determined by the one or more Bayesian filters 108. In this block 408, not only is the probability density function of the state estimate at each grid points modified, but so are the locations of the grid points (e.g. assuming that there is predicted estimated horizontal movement of the moveable object 100).

New Grid Construction

Predictively estimating a new a priori horizontal position (for the next time instant) begins with definition of new grid having grid points denoted as $\xi_{k+1}^{(j)}$, $j=1, \ldots, M$. The new grid may have the same or different number of grid points, and the same or different resolution $\delta_p$, as the grid from time instant k (the old grid). Three typical situations may occur in design of the new grid depending on the number of significant grid points. The significant grid points are defined as those grid points which have the associated probability greater than a certain threshold. Number of significant grid points directly affects the quality of approximation of the continuous PDF by its discretized version, therefore, it affects the expected performance of the filter.

If the number of significant points is at a reasonable, threshold level, the number and resolution of the grid points may remain constant between the old and new grids. Then, the old grid points are just shifted based upon known input vector $u_k$ (which is a change of horizontal position based upon the measurement data 115 from the inertial navigation system 107):

$$\xi_{k+1}^{(j)} = \xi_k^{(j)} + u_k \quad \text{(Equation 17)}$$

If the number of the significant points is below a reasonable, threshold level, then the number of grid points in the new grid is increased in comparison to the number of grid points in the old grid. Correspondingly, the resolution of the new grid points $\delta_p$ is smaller than the resolution of the old grid points $\delta_p$ to affect an increase in the number of the grid points and significant points in the new grid. Then, the new grid is shifted based upon known input vector $u_k$ (which is a change of horizontal position based upon the output of the inertial navigation system 107):

$$\xi_{k+1}^{(j)} = \xi_k^{(j)} + u_k \quad \text{(Equation 18)}$$

If the number of the significant points is above a reasonable, threshold level, then then number of grid points in the new grid is decreased in comparison to the number of grid points in the old grid. Correspondingly, the resolution of the new grid points $\delta_p$ is larger than the resolution of the old grid points $\delta_p$ to affect a decrease in the number of the grid points and significant points in the new grid. Then, the new grid is shifted based upon known input vector $u_k$ (which is a change of horizontal position based upon measurement data 115 from the inertial navigation system 107).

Determine Predictive Discretized PDF of Non-Linear Portion of State Vector with the Point Mass Filter The predictive discretized PDF of the non-linear part of the state space model is determined by the following convolution:

$$P_{k+1|k}^{(j)}(\xi_{k+1}^{(j)}) = \sum_{i=1}^{N} p_{w^n}(\xi_{k+1}^{(j)} - \xi_k^{(i)} - u_k) P_{k|k}^{(i)}(\xi_k^{(i)}) \Delta \quad \text{(Equation 19)}$$

$$= \sum_{i=1}^{N} N(\xi_{k+1}^{(j)} : \xi_k^{(i)} + u_k, Q^n) P_{k|k}^{(i)}(\xi_k^{(i)}) \Delta$$

where $p_{w^n}(w_k^n) \cong p_{w^n}(\xi_{k+1}^{(j)} - \xi_k^{(i)} - u_k)$. Thus, the predictive discretized PDF is:

$$p(x_{k+1}^n | z^k) \cong \sum_i P_{k+1|k}^{(j)}(\xi_k^{(j)}) S\{x_{k+1}^n : \xi_{k+1}^{(i+1)}, \delta_p\} \quad \text{(Equation 20)}$$

Determine Predictive Discretized PDF of Linear Portion of State Vector with the Bayesian Filters The predictive discretized PDF of the linear part of the state space model is determined as follows. The predictive estimates, based upon the measurement data 115 from the inertial navigation system 107, of the linear part of the state space model and which correspond to the old grid points $\xi_k^{(i)}$, are shifted forward in time according to:

$$\hat{x}_{k+1|k}^{l(i)} = \alpha \hat{x}_{k|k}^{l(i)}, \forall i,$$

$$P_{k+1|k}^{l(i)} = \alpha P_{k|k}^{l(i)} \alpha^T + Q^l, \forall i, \quad \text{(Equation 21)}$$

These predictive estimates are then transformed into the space of the new grid points $\xi_{k+1}^{(j)}$. The transformation, which is based upon the relationship for moments of Gaussian mixture PDFs, is:

(Equation 22)

$$\hat{x}_{k+1|k}^{l(j)} = \sum_{i=1}^{N} \varpi_{k+1|k}^{(i,j)} \hat{x}_{k+1|k}^{l(i)},$$

$$P_{k+1|k}^{l(j)} = \sum_{i=1}^{N} \varpi_{k+1|k}^{(i,j)} \left( P_{k+1|k}^{l(i)} + (\hat{x}_{k+1|k}^{l(i)} - \hat{x}_{k+1|k}^{l(j)})(\hat{x}_{k+1|k}^{l(i)} - \hat{x}_{k+1|k}^{l(j)})^T \right).$$

where:

$\hat{x}_{k+1|k}^{l(i)}, P_{k+1|k}^{l(i)}$ = estimates related to old grid points $\hat{x}_{k+1|k}^{l(j)}, P_{k+1|k}^{l(j)}$ = estimates related to new grid points $$\varpi_{k+1|k}^{(i,j)} = \frac{\omega_{k+1|k}^{(i,j)}}{\sum_{i=1}^{N} \omega_{k+1|k}^{(i,j)}} = \text{normalized transition weight matrix from old to new grid}$$

$$\omega_{k+1|k}^{(j)} = \sum_{i=1}^{N} \omega_{k+1|k}^{(i,j)}$$

= probability that new $j$-$th$ grid point is reached from all old grid points $$\omega_{k+1|k}^{(i,j)} = p_{w^n}(\xi_{k+1}^{(j)} - \xi_k^{(i)} - u_k)$$

$= N(\xi_{k+1}^{(j)} : \xi_k^{(i)} + u_k, Q^n)$ = transition weight from old $i$-$th$ grid point to $j$-$th$ new grid point

What is claimed is:

1. A data-based referenced navigation system, comprising:
   a processing system comprising memory circuitry coupled to processor circuitry;
   an inertial navigation system coupled to the processing system;
   at least one sensor coupled to the processing system;
   wherein the memory circuitry comprises geo-mapping data, models, measurement data, and an estimator;
   wherein the measurement data comprises data measured by at least one of the inertial navigation system, and the at least one sensor;
   wherein the estimator is a Rao-Blackwellized point mass filter which comprises a point mass filter, and at least one Bayesian filter;
   wherein the processing system is configured to estimate a horizontal position on a surface based upon the geo-mapping data, the models, the measurement data, and the estimator; and
   wherein the processing system is further configured to:
      estimate, with the point mass filter, the horizontal position on the surface based upon the geo-mapping data and the measurement data;
      estimate, with the one or more Bayesian filters, remaining state parameters based upon an output of the point mass filter and the measurement data; and
      predict, with the point mass filter, an a priori horizontal position, on the surface for a future time when next measurement data will be obtained using the estimate of the horizontal position and a known input vector that is output from the inertial measurement system; and
      predict, with the one or more Bayesian filters, an a priori remaining state parameters for the future time when the next measurement data will be obtained.

2. The data-based referenced navigation system of claim 1, wherein the models comprise a state equation and a measurement equation.

3. The data-based referenced navigation system of claim 1, wherein the at least one Bayesian filter comprises at least one Kalman filter.

4. The data-based referenced navigation system of claim 1, wherein the at least one sensor comprises at least one of a barometric altimeter, a radar altimeter, an inertial measurement unit including at least one of an accelerometer and a gyroscope, a pressure sensor, a magnetometer, an accelerometer, a gravity gradiometer, a gravimeter, a water depth sensor, a bathymetric echo-sounder, a camera-type sensor, and a star tracker.

5. The data-based referenced navigation system of claim 1, wherein the geo-mapping data comprises at least one of terrain geo-mapping data, bathymetric geo-mapping data, gravity field geo-mapping data, gravity gradient field geo-mapping data, magnetic field geo-mapping data, stellar image-based geo-mapping data, and terrestrial image-based geo-mapping data.

6. The data-based referenced navigation system of claim 1, wherein the models comprise:

$$x_{k+1} = \begin{bmatrix} x_{k+1}^n \\ x_{k+1}^l \end{bmatrix} = \begin{bmatrix} F & \beta \\ \gamma & \alpha \end{bmatrix} x_k + w_k$$

$$z_k = \tilde{h}(x_k^n + \hat{x}_k^{DR}) + H x_k^l + v_k$$
$$= h(x_k^n) + H x_k^l + v_k,$$

where
$X_{k+1}$ is a state for which time behavior is modelled by a state equation,
$\hat{x}_k^{DR}$ is a horizontal position of a moveable object provided by the inertial navigation system,
$x_{k+1}^n$ is a non-linear component of the state and which is a difference between the horizontal position of the moveable object and the true position,
$x_{k+1}^l$ is a linear component of at least one bias of the at least one sensor, the inertial navigation system, and the geo-mapping data,
$z_k$ is a parameter measured by the at least one sensor,
F is a known matrix with elements determined on the basis of properties of position estimate bias of the inertial navigation system in longitudinal and latitudinal directions,
$\alpha$ is a matrix with elements determined on the basis of properties of biases of at least one of the one or more sensors, the inertial navigation system, and the geo-mapping data,
H is a known matrix in the measurement equation relating the linear component of the state vector $x_k^l$ and the measurement,
$\beta,\gamma$ are known system matrices describing relations between linear and non-linear parts of the model, and
h(•) is a non-linear function representing the geo-mapping data, and maps the outputs of the inertial navigation system, and the bias of those outputs, to horizontal position on the map.

7. The data-based referenced navigation system of claim 6, wherein $$\beta = \begin{bmatrix} 0 & 0 \\ 0 & 0 \end{bmatrix} \text{ and } \gamma = \begin{bmatrix} 0 & 0 \\ 0 & 0 \end{bmatrix}.$$

8. The data-based referenced navigation system of claim 1, wherein the processing system is further configured to:
   initialize the point mass filter;
   initialize the one or more Bayesian filters;
   obtain measurement data from at least one of the one or more sensors, and the inertial navigation system; and
   obtain the geo-mapping data.

* * * * *